(12) United States Patent
Krökel et al.

(10) Patent No.: US 10,093,233 B2
(45) Date of Patent: Oct. 9, 2018

(54) METHOD AND APPARATUS FOR DISPLAYING THE SURROUNDINGS OF A VEHICLE, AND DRIVER ASSISTANCE SYSTEM

(71) Applicants: Conti Temic microelectronic GmbH, Nürnberg (DE); Continental Automotive GmbH, Hannover (DE); Continental Teves AG & Co. oHG, Frankfurt (DE)

(72) Inventors: Dieter Krökel, Eriskirch (DE); Christian Exner, Lindau (DE); Herbert Meier, Regensburg (DE); Stefan Lüke, Rosbach vor der Höhe (DE); Sebastian Houben, Bonn (DE); Jan Salmen, Bochum (DE)

(73) Assignees: Conti Temic microelectronic GmbH, Nürnberg (DE); Continental Automotive GmbH, Hannover (DE); Continental Teves AG & Co. oHG, Frankfurt (DE)

( * ) Notice: Subject to any disclaimer, the term of this patent is extended or adjusted under 35 U.S.C. 154(b) by 221 days.

(21) Appl. No.: 15/021,529

(22) PCT Filed: Sep. 26, 2014

(86) PCT No.: PCT/DE2014/200509
§ 371 (c)(1),
(2) Date: Mar. 11, 2016

(87) PCT Pub. No.: WO2015/048967
PCT Pub. Date: Apr. 9, 2015

(65) Prior Publication Data
US 2016/0221503 A1 Aug. 4, 2016

(30) Foreign Application Priority Data

Oct. 2, 2013 (DE) .......................... 10 2013 220 005

(51) Int. Cl.
*H04N 7/18* (2006.01)
*B60R 1/00* (2006.01)
(Continued)

(52) U.S. Cl.
CPC ................ *B60R 1/00* (2013.01); *G06T 5/006* (2013.01); *G06T 7/60* (2013.01); *G06T 7/75* (2017.01);
(Continued)

(58) Field of Classification Search
CPC .. G06T 7/75; G06T 5/006; G06T 7/60; H04N 5/23293; H04N 5/247
(Continued)

(56) References Cited

U.S. PATENT DOCUMENTS 5,983,251 A * 11/1999 Martens ............... H04N 19/186
375/E7.083
8,346,706 B2 * 1/2013 Groitzsch .............. G01C 21/26
706/47

(Continued)

FOREIGN PATENT DOCUMENTS

DE 10059900 6/2002
DE 10109665 9/2002
(Continued)

OTHER PUBLICATIONS

International Preliminary Report on Patentability and Written Opinion for International Application No. PCT/DE2014/200509 dated Apr. 5, 2016.
(Continued)

*Primary Examiner* — Helen Shibru
(74) *Attorney, Agent, or Firm* — RatnerPrestia

(57) ABSTRACT

A method and an apparatus for displaying the surroundings of a vehicle and to a driver assistance system having such an apparatus having at least one sensor for producing sensor
(Continued)

data for the surroundings of a vehicle. In this case, the sensor data are conditioned to produce raw image data, if need be using a grid model of the surroundings of the vehicle, if need be the raw image data are processed to produce object information using a grid model of the surroundings of the vehicle, and the object information obtained is used to condition raw image data to produce image object data, and finally the image object data are displayed.

16 Claims, 10 Drawing Sheets

(51) Int. Cl.
| | | |
|---|---|---|
| G06T 5/00 | (2006.01) | |
| G06T 7/60 | (2017.01) | |
| H04N 5/232 | (2006.01) | |
| H04N 5/247 | (2006.01) | |
| G06T 7/73 | (2017.01) | |

(52) U.S. Cl.
CPC ......... *H04N 5/23293* (2013.01); *H04N 5/247* (2013.01); *G06T 2200/04* (2013.01); *G06T 2207/10016* (2013.01); *G06T 2207/30241* (2013.01); *G06T 2207/30252* (2013.01); *G06T 2207/30261* (2013.01)

(58) Field of Classification Search
USPC ......................................................... 348/148
See application file for complete search history.

(56) References Cited

U.S. PATENT DOCUMENTS

| 8,994,520 | B2 | 3/2015 | Stahlin | |
|---|---|---|---|---|
| 9,715,761 | B2* | 7/2017 | Lee | G06T 17/10 |
| 9,927,813 | B1* | 3/2018 | Ferguson | G05D 1/024 |
| 2005/0089213 | A1* | 4/2005 | Geng | G06K 9/00214 |
| | | | | 382/154 |
| 2012/0036016 | A1* | 2/2012 | Hoffberg | G05B 15/02 |
| | | | | 705/14.58 |
| 2012/0069205 | A1* | 3/2012 | Dowski, Jr. | G02B 27/0075 |
| | | | | 348/208.99 |
| 2014/0015930 | A1* | 1/2014 | Sengupta | G06K 9/00771 |
| | | | | 348/46 |
| 2015/0149652 | A1* | 5/2015 | Singer | H04L 65/602 |
| | | | | 709/231 |
| 2018/0089833 | A1* | 3/2018 | Lewis | G06T 7/0067 |

FOREIGN PATENT DOCUMENTS

| DE | 10247563 | 4/2004 |
|---|---|---|
| DE | 10257484 | 7/2004 |
| DE | 102009014437 | 11/2009 |
| DE | 102010040803 | 3/2012 |
| DE | 102012203171 | 8/2013 |
| EP | 1462762 | 9/2004 |
| WO | 2011060759 | 5/2011 |

OTHER PUBLICATIONS

German Search Report for German Application No. 10 2013 220 005.6 dated Jan. 17, 2014, including partial translation.
International Search Report for International Application No. PCT/DE2014/200509 dated Jan. 22, 2015.
Izadi, S., et al., "KinectFusion: Real-time 3D reconstruction and interaction using a moving depth camera," Oct. 16-19, 2011, pp. 559-568, Proceedings of the 24th Annual ACM symposium on User interface software and technology, Santa Barbara, CA.
Koeser, K., et al., "An analysis-by-synthesis camera tracking approach based on free-form surfaces," Sep. 12, 2007, pp. 122-131, Pattern Recognition, [Lecture notes in Computer Science], Springer Berlin Heidelberg.
Nedevschi, S., et al., "A sensor for urban driving assistance systems based on dense stereovision," Jun. 13-15, 2007, pp. 276-283, Proceedings of the 2007 IEEE Intelligent Vehicles Symposium, Istanbul, Turkey.
Saxena, A., et al., "Make 3D: Learning 3D scene structure from a single still image," May 2009, pp. 824-840, vol. 31(5), IEEE Transactions on Pattern Analysis and Machine Intelligence.
Strothoff, S., et al., "Interactive generation of virtual environments using MUAVs," Mar. 19-20, 2011, pp. 89-96, Proceedings of the 2011 IEEE International Symposium on Virtual Reality Innovation, Singapore.
Written Opinion of the International Searching Authority for International Application No. PCT/DE2014/200509 dated Jan. 22, 2015.
Zhang, W., et al., "Primitive-based building reconstruction by integration of lidar data and optical imagery," Aug. 29-31, 2011, pp. 7-12, vol. XXXVIII-5/W12, International Archives of the Photogrammetry, Remore Sensing and Spatial Information Sciences, Calgary, CN.

\* cited by examiner

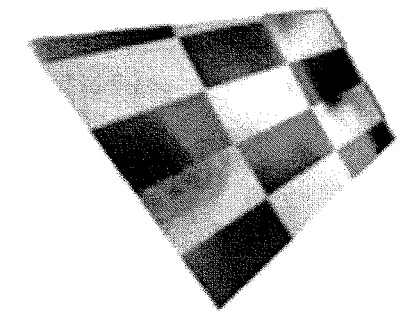
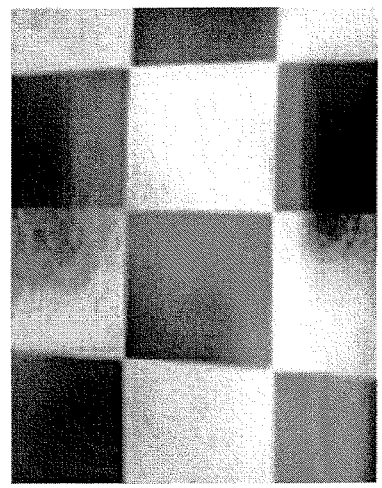
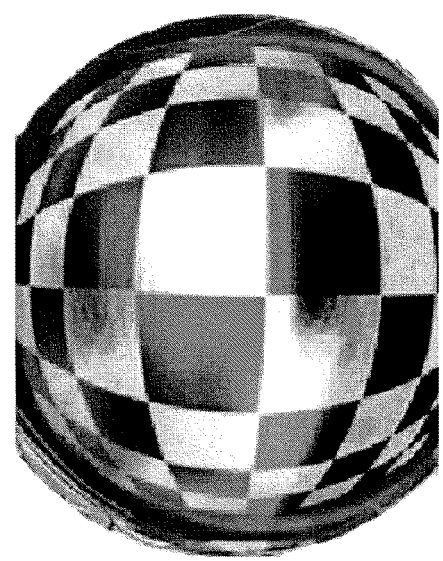
Fig. 5

METHOD AND APPARATUS FOR DISPLAYING THE SURROUNDINGS OF A VEHICLE, AND DRIVER ASSISTANCE SYSTEM

CROSS REFERENCE TO RELATED APPLICATIONS

This application is the U.S. National Phase Application of PCT International Application No. PCT/DE2014/200509, filed Sep. 26, 2014, which claims priority to German Patent Application No. 10 2013 220 005.6, filed Oct. 2, 2013, the contents of such applications being incorporated by reference herein.

FIELD OF THE INVENTION

The invention relates to a method and an apparatus for displaying the surroundings of a vehicle, which are particularly suitable for use in driver assistance systems, as well as a driver assistance system.

BACKGROUND OF THE INVENTION

Driver assistance systems as well as methods and apparatuses for displaying the surroundings of a vehicle are in principle known from the prior art.

Reference is made regarding this, for example, to DE 10059900A1, which is incorporated by reference as well as DE10109665A1, which is incorporated by reference. So-called camera-based top view, surround view and rear view systems are increasingly found in vehicles, in order to display the immediate environment of the vehicle to the driver and, as a result, to make it easier for him to e.g. maneuver his vehicle.

DE10247563A1, which is incorporated by reference describes a driver assistance system, in which objects which may be dangerous to a vehicle appear more pronounced on a display device than those objects which pose less of a danger. DE10257484A1, which is incorporated by reference discloses a driver assistance system having a display device for representing objects detected with a camera correctly in terms of the perspective. Furthermore, additional information regarding the detected objects can be graphically displayed, in order to improve the perception thereof by a driver.

SUMMARY OF THE INVENTION

An aspect of the invention is an improved method and an improved apparatus for displaying the surroundings of a vehicle.

One embodiment of this invention relates to a method for displaying the surroundings of a vehicle comprising the following steps:
  detecting of the surroundings of a vehicle with at least one sensor and producing of sensor data for the surroundings of a vehicle,
  conditioning of the sensor data to produce raw image data,
  processing of the raw image data to produce object information using a grid model of the surroundings of the vehicle,
  use of the object information obtained and/or of a grid model to condition raw image data to produce image object data,
  displaying of the image object data.

In particular, it can be provided that the conditioning of the sensor data to produce raw image data, the processing of the raw image data to produce object information and the conditioning of the raw image data to produce image object data, using the object information and/or a grid model, are effected by means of at least two separate devices. In this case, the conditioning of the sensor data to produce raw image data is preferably effected by means of an image conditioning device and the processing of the raw image data to produce object information is preferably effected by means of an image processing device, wherein the image processing device receives the raw image data from the image conditioning device via a first data link (forward channel). Furthermore, the conditioning of the raw image data to produce the image object data is preferably effected by means of the image conditioning device, wherein the image conditioning device receives the object information from the image processing device via a second data link (backward channel). The image conditioning device is preferably a device for conditioning the sensor data and/or the raw image data, in order to display image data in the vehicle. The image processing device is preferably a device for obtaining object information, for example, for a device for controlling vehicle parameters and/or vehicle functions. As a result, a multiple-step image data processing method is created, wherein the object information obtained from the image processing for controlling vehicle parameters and/or vehicle functions can be advantageously used, in particular by means of a backward channel from the image processing device to the image conditioning device, for the conditioning of the image data for display in the vehicle, for example in order to highlight objects and/or to mark them in the image when the image data is displayed.

An additional embodiment of this invention relates to a method for displaying the surroundings of a vehicle comprising the following steps:
  detecting of the surroundings of a vehicle with at least one sensor and producing of sensor data for the surroundings of a vehicle,
  conditioning of the sensor data to produce raw image data in a first conditioning step,
  conditioning of the raw image data to produce corrected image data using a grid model in a second conditioning step,
  use of object information obtained on the basis of sensors in order to condition the corrected image data to produce image object data,
  displaying of the image object data.

A multiple-step method which improves the image data is therefore provided. The sensor data are conditioned to produce raw image data, with the aid of which object information can then be obtained, which can in turn be fed back in order to condition raw image data. Raw image data conditioned from sensor data in a forward channel direction can thus be transmitted, in order to process the raw image data and, in a backward channel, object information for (if need be further) conditioning of raw image data can be transmitted. As a result, the conditioning of the image data can be improved and, afterwards, combined image object data containing additional information compared to the pure image data can be displayed.

The at least one sensor can, in this case, be configured as any kind of suitable sensor for producing raw image data, in particular as an optical sensor such as e.g. as an optical camera, night vision system and/or residual light amplification system, infrared camera or thermal image camera. However, the sensor can in principle also be configured to receive electromagnetic radiation of different wavelengths such as e.g. radar or lidar, or to receive sound waves such as e.g. ultrasound.

The object information can be obtained on the basis of a grid model of the surroundings of the vehicle. The object information can therefore be detected e.g. in the form of a raster card and/or stored and/or transmitted. In addition, information can be specifically assigned to partial areas of the grid model.

Object information can be information for characterizing and/or identifying objects and/or conditions of objects, in particular this information can be the position, size and/or height, extent, brightness, direction of movement, acceleration, relative movement to the sensor, relative direction of movement to the sensor, relative acceleration to the sensor.

A grid model can also be used within the framework of conditioning the raw image data. A suitable correction and/or distortion correction of raw image data, in particular of distorted raw image data can, for example, be achieved with this due to optical and/or metrological distortions due to particular sensor characteristics such as e.g. imaging properties. Corrected image data, which correspond to corrected images, are therefore produced from raw image data. These can then be taken as the basis for additional image processing steps and/or image conditioning steps.

It can be provided that the object information is verified and/or stabilized by being compared with data from additional sensors. Additional sensors and/or sensor data can therefore also be enlisted in addition or as a supplement to the aforementioned sensor data which are used for producing the raw image data. These can e.g. be additional optical sensors such as e.g. optical cameras, night vision systems and/or residual light amplification systems, infrared cameras or thermal image cameras. However, the additional sensors can also in principle be configured to receive electromagnetic radiation of different wavelengths such as e.g. radar or lidar, or to receive sound waves such as e.g. ultrasound. The extent of the detected object information and/or the accuracy of the detected object information can be increased by the additional sensor information and a contribution is therefore made to the object information being stabilized, and/or errors in the object information obtained can be reduced and/or identified object information and/or objects can be verified. It can be provided that, within the framework of the processing of the raw image data, historical and/or predicted object information is additionally used. A time curve of object information can therefore be determined and/or stored and/or called up from a storage device and can also be enlisted during the processing of the raw image data. The change over time in object information (such as the change over time in position, size, extent, brightness, direction of movement, acceleration, relative movement to the sensor, relative direction of movement to the sensor, relative acceleration to the sensor) can also be enlisted as well. It can be provided that the grid model of the surroundings comprises cells, wherein partial object information is assigned to said cells and object information is produced from partial object information in an object identification step. The cells of the grid model can be configured identically, i.e. have the same size, form and orientation.

The cells can therefore have a uniform distribution and a uniform configuration. The cells of the grid model can, however, also have a size and/or form and/or orientation dependent on the position of the cell in the grid.

In particular, it can be provided that a 3D grid model is used as a grid model, therefore a grid model in which the grid comprises a three-dimensional form. A three-dimensional form is to be deemed to be any form which deviates in at least a partial area from a two-dimensional and, thus, planar form. Raw image data can be projected onto the 3D grid model using a projection algorithm. Thus, a particularly well suited correction and/or distortion correction of raw image data, in particular of distorted raw image data—for example due to optical and/or metrological distortions due to particular sensor characteristics such as e.g. imaging properties—is/are achieved.

The 3D grid model of the surroundings of the vehicle can, in particular, constitute a model of a curved surface, wherein the radius of curvature increases as the distance increases from the vehicle and/or from the sensor producing the sensor data. It has been shown that such models of a curved surface, in particular having a curvature which increases with the distance, are suitable for correcting distortions due to wide-angle effects such as those which occur e.g. with optical fish eye sensors or other sensors with comparable imaging properties.

Cell-related partial object information can be assigned to the cells of the grid model. Such partial object information can be information for identifying and/or characterizing detected object parts or detected structures such as information regarding the position, size such as e.g. object heights, form, extent, brightness, direction of movement, acceleration, relative movement to the sensor, relative direction of movement to the sensor, relative acceleration to the sensor.

Cell-related object profiles can be formed from this partial object information and assigned to the respective cell. Object profiles of one or more cells can be combined to produce objects. If, within the framework of the method, an object identification step is carried out, object information regarding identified objects can be transmitted with object information regarding object heights to the image conditioning device.

An additional embodiment of this invention relates to an apparatus for displaying the surroundings of a vehicle, comprising:
  at least one sensor for detecting the surroundings of a vehicle and for producing sensor data for the surroundings of a vehicle,
  an image conditioning device having image data conditioning areas which are set up to condition the sensor data to produce raw image data and to condition raw image data using object information and/or a grid model to produce image object data,
  an image processing device which comprises a data link to the image conditioning device and for processing raw image data to produce object information using a grid model, and
  a display apparatus for displaying the image object data.

With respect to the advantages and possible additional configurations of the apparatus according to the invention, reference is made to the explanations regarding the method according to the invention, which similarly apply to the apparatus according to the invention.

The image conditioning device is preferably connected via a first data link (forward channel) to the image processing device, wherein the image processing device receives the raw image data conditioned by the image conditioning device via the first data link. Furthermore, the image processing device is preferably connected via an additional data link (backward channel) to the image conditioning device, wherein the image conditioning device receives the object information obtained by the image processing device from the raw image data via the additional data link.

The image conditioning device is, in particular, connected to the display apparatus for displaying image object data obtained from the raw image data and the object data.

A forward channel can therefore be provided from the image conditioning device to the image processing device and a backward channel can be provided from the image processing device back to the image conditioning device. The image conditioning device is set up to condition the sensor data to produce raw image data. Furthermore, the image conditioning device can be set up to condition raw image data using object information. However, the image conditioning device can also be set up to condition raw image data using a grid model—if need be incorporating additional object information—to produce image object data.

The at least one sensor can, as already explained above, be configured as any kind of suitable sensor for producing raw image data, in particular as an optical sensor such as e.g. as an optical camera, night vision system and/or residual light amplification system, infrared camera or thermal image camera. However, the sensor can in principle also be configured to receive electromagnetic radiation of different wavelengths such as e.g. radar or lidar, or to receive sound waves such as e.g. ultrasound.

Additional sensors can be provided, which have a data link to the image processing device. In this case, the image processing device can be set up to verify and/or stabilize the object information by means of a comparison with data from the additional sensors. As already explained above, these can e.g. be additional optical sensors such as e.g. optical cameras, night vision systems and/or residual light amplification systems, infrared cameras or thermal image cameras. However, the additional sensors can also in principle be configured to receive electromagnetic radiation of different wavelengths such as e.g. radar or lidar, or to receive sound waves such as e.g. ultrasound.

The image conditioning device can comprise image data conditioning areas which can differ functionally, in terms of programming technology or hardware technology, according to their functions. The image conditioning device can thus comprise a first image data conditioning area for conditioning the sensor data to produce raw image data and a second image data conditioning area to condition raw image data and object information to produce image object data.

A data storage device can be provided in order to store historical and/or predicted object information, wherein the image processing device is set up to use historical and/or predicted object information within the framework of the processing of the raw image data. A time curve of object information can be stored in this data storage device and can be called up from this storage device and a data link to the image processing device can be provided, via which link the historical and/or predicted object information can be transmitted for processing of the raw image data.

Furthermore, an additional data storage device for storing a grid model of the surroundings of the vehicle can be provided, wherein the additional data storage device is connected via a data link to the image processing device and the image processing device can be set up to identify objects on the basis of partial object information, which is assigned to cells of the grid model. Alternatively or, in addition, the image conditioning device can be set up to condition raw image data on the basis of the grid model, wherein the image conditioning device is then connected to the data storage device via a data link. An additional embodiment of the invention relates to a driver assistance system having an apparatus according to the invention and as described herein. Additional advantages and possible applications of this invention are set out in the following specification in conjunction with the embodiment examples shown in the drawings.

BRIEF DESCRIPTION OF THE DRAWINGS

The terms and assigned reference numerals in the list of reference numerals indicated at the back of this application are used in the specification, in the claims, in the summary and in the drawings, wherein

FIG. 5 shows a diagrammatic view of the distortion correction and perspective correction of a fish eye camera image (raw image data);

DETAILED DESCRIPTION OF THE PREFERRED EMBODIMENTS

Figure 1:
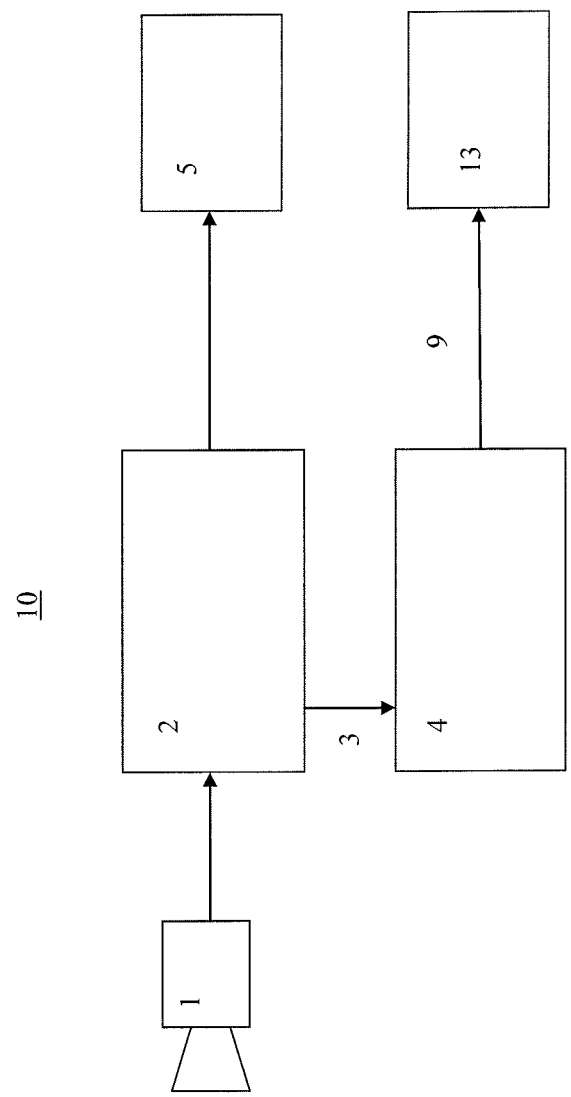
FIG. 1 shows a diagrammatic view of a system having automatic driver assistance functionalities.

The same, functionally similar and functionally related elements can be provided with the same reference numerals in the following specification. Absolute values are only indicated below by way of example and are not to be deemed to restrict the invention.

Driver assistance systems are to increasingly be equipped with automatic driver assistance functionalities. To this end, image processing can be used, in order to automatically identify objects, in particular obstacles, and subsequently facilitate an intervention in the vehicle dynamics. FIG. 1 shows such a driver assistance system 10 diagrammatically.

This driver assistance system 10 comprises an optical sensor, for example a camera as a first sensor 1 for acquiring sensor data for the surroundings of a vehicle. An image conditioning device 2 is connected to the first sensor 1. The image conditioning device 2 is set up to condition the sensor data to produce raw image data and/or to produce conditioned image data. The image conditioning device 2 is, furthermore, connected to a display apparatus 5—in particular a suitable display—in order to display the conditioned image data to the driver in the vehicle.

The driver assistance system 10 additionally comprises an image processing device 4 which is connected to the image conditioning device 2 via a data link 3 and receives conditioned raw image data from sensor data from there. The image processing device 4 is connected to the vehicle dynamics 13—i.e. a device for controlling vehicle parameters and/or vehicle functions via an additional data link 9.

Figure 2:
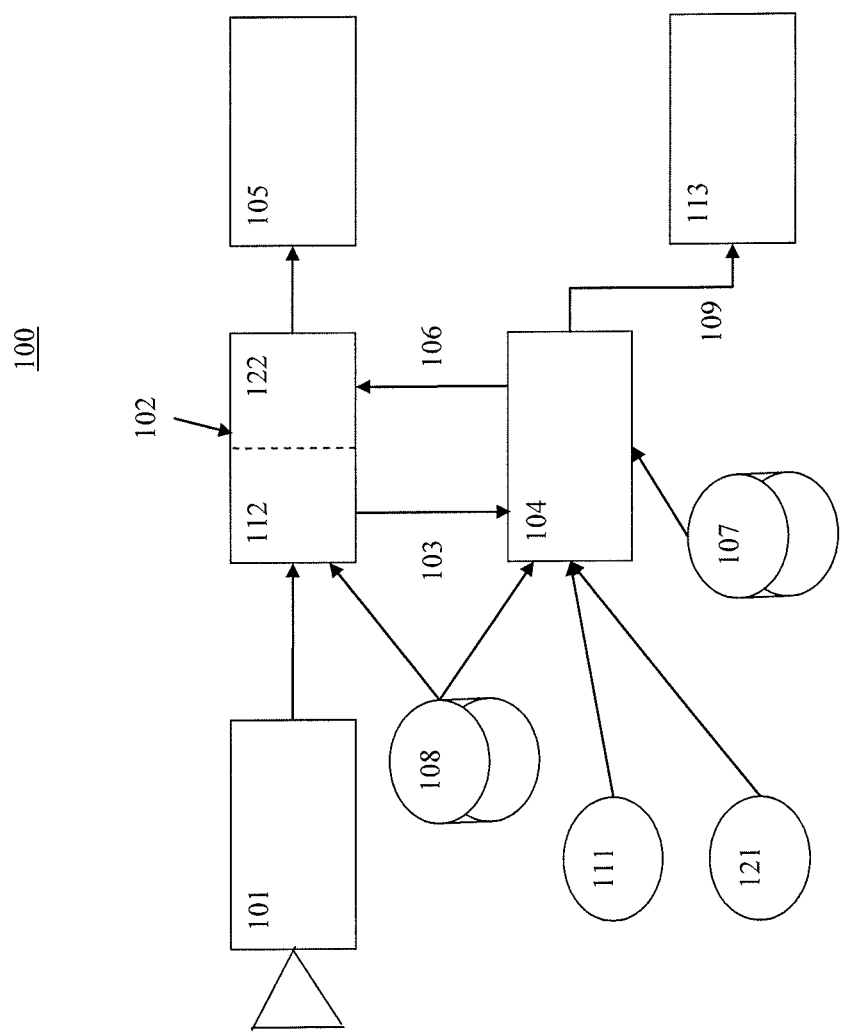
FIG. 2 shows a diagrammatic view of a system having automatic driver assistance functionalities comprising a plurality of sensors and backward channel for transmitting object information.
Figure 3:
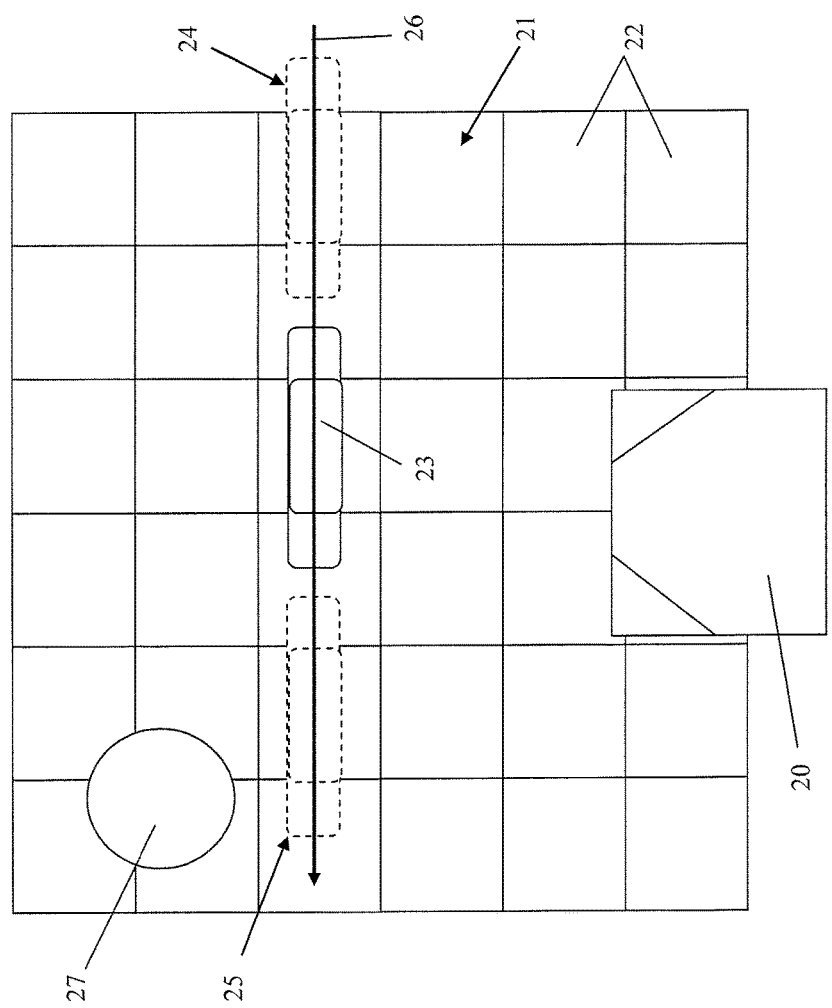
FIG. 3 shows a diagrammatic view of a planar grid model.

It can now in particular be provided that, in the case of a driver assistance system, objects identified, particularly obstacles, are displayed with a display device prior to an intervention in the vehicle dynamics, in order to make the automatic vehicle intervention comprehensible to the driver or to allow him to react prior to the intervention in the vehicle dynamics. FIG. 2 shows such a driver assistance system 100 diagrammatically.

The driver assistance system 100 according to FIG. 2 also comprises a first sensor 101 in the form of an optical sensor, e.g. a camera for acquiring sensor data for the surroundings of a vehicle. An image conditioning device 102 is, in turn, connected to the first sensor 101. The image conditioning device 102 is set up to condition the sensor data to produce raw image data in the driver assistance system 100 according to FIG. 2. The image conditioning device 102 can thereby comprise image data conditioning areas 112, 122 which are functionally separated from one another, which differ in terms of programming technology or hardware technology and which can be arranged separated from one another in terms of programming technology or hardware technology, so that various image conditioning steps can be carried out in parallel. Thus, the image conditioning device 102 can comprise a first image data conditioning area 112 for conditioning the sensor data to produce raw image data and a second image data conditioning area 122 for conditioning raw image data and object information to produce image object data. The image conditioning device 102 is connected to a display apparatus 105—in particular a suitable display, in order to display the conditioned image data to the driver in the vehicle.

The image conditioning device 102—and, in this case, in particular the first image data conditioning area 112 for conditioning the sensor data to produce raw image data—is connected via a first data link 103 (forward channel) to an image processing device 104 which receives conditioned raw image data from the image conditioning device 102. The image processing device 104 is, on the one hand, connected via an additional data link 109 to the vehicle dynamics 113—i.e. a device for controlling vehicle parameters and/or vehicle functions. On the other hand, the image processing device 104 is connected via an additional data link 106 (backward channel) to an image conditioning device 102—and, in this case, in particular to a second image data conditioning area 122 for conditioning raw image data and object information to produce image object data.

According to the embodiment according to FIG. 2 it is thus made possible to transmit object information such as e.g. distance from the obstacle and the height thereof by means of a backward channel from the system block of the image processing into the system block of the image conditioning. This information can be used in the image conditioning, in order to display a potential hazard posed by identified objects (e.g. by colored marking of objects in the conditioned image object data) and/or the distance and/or height thereof relative to the driver's own vehicle.

The identification of objects in the image processing device 104 can be based on a grid model 21, 221. Cells 22, 222 of a grid model 21, 221 enclosing the vehicle 20, 220 are defined. This grid model 21, 221 can be stored, e.g. in a data storage device 108 which has a data link to the image conditioning device 102 and to the image processing device 104. Depending on the configuration of the invention, the data storage device 108 can also only be connected to one of the two devices 102, 104. Particular partial object information, which is determined and/or identified by the image processing device 104, can now be assigned to each of the cells 22, 222. Object heights, extent, position or speed identified e.g. in the camera image can be assigned to the cells 22, 222. The example of object height is to be observed here. It can happen that only a part of an object 23, 27 is located in a cell and, therefore, only corresponding partial object information for this part of the object 23, 27—in this case height information—is assigned. The partial object information—for example assigned as object profiles—is combined to produce individual objects 23, 27. This grid information which is assigned to the individual cells 22, 222, together with the object heights and the identified objects 23, 27, is transmitted back to the image conditioning device 102.

In addition to the extent and position of objects 23, 27 (i.e. of potential obstacles), the direction of movement 26 thereof (in the case of dynamic objects 23) and movement speed, as well as the type (person, bicycle, car, other object and/or obstacle) and probability of collision for an extrapolated movement can also be meaningfully accommodated in the display. Historical object information 24 and/or predicted object information 25 as well as past and predicted trajectories of the driver's own car can, for example, be assigned to the relevant objects 23 as plumes and can also be correspondingly controlled by means of the image processing device 104 and image conditioning device 102 and displayed in a display apparatus 105 (display). Likewise, the non-existence of obstacles in certain areas can also be visualized (e.g. colored highlighting of the entire drivable surface in the image). Camera panning or enlargements as critically identified points is/are also conceivable.

Figure 4:
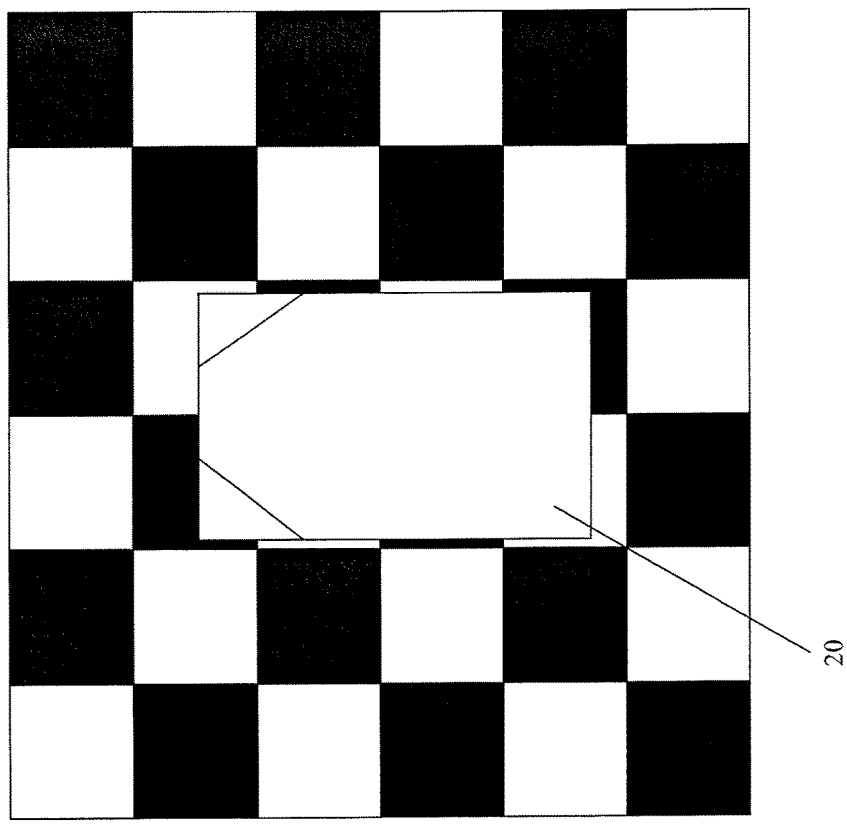
FIG. 4 shows a diagrammatic view of a distortion corrected top view image.

The object information and/or the grid model 21, 221 can be used in the image conditioning device 102, in order to optimize the distortion correction of raw image data prior to producing the top view data. FIG. 4 shows such a top view representation (or bird's eye view) of a vehicle 20, 220 diagrammatically, which offers the driver a perspective as if he were observing the vehicle from above. To this end, the image is generally made up of four camera images (mounted at the front and rear and on the right and left of the vehicle 20, 220, as shown for example in FIG. 6). Usual top view systems project the recorded 2D images into a 2D plane or onto a 2D spherical surface, in order to give the user the impression as if he were looking onto the vehicle and the surroundings from above. The different images to be shown (whether these are all-round view, lateral view or reversing view) are produced according to the following principle, the steps of which are shown diagrammatically in FIG. 5: an image—i.e. raw image data—is/are produced in accordance with FIG. 5 a) on the basis of sensor data from a camera, here a fish eye camera. The imaging properties of the fish eye camera result in a distorted image. A fish eye correction produces the result as shown in FIG. 5 b). A correction of the perspective with the result as shown in FIG. 5 c) is carried out as an additional step. In this way, raw image data from a plurality of sensors 1, 101, 111, 121, 131, in particular a plurality of cameras, are combined to produce a top view image as shown in FIG. 4.

The fish eye cameras, which operate in such a system and provide the so-called fish eye images, bring with them an important advantage: the large viewing angle. With such an angle (horizontally >180° view, vertically >130° view) per camera, the entire vehicle environment can be observed all around with only four cameras. This leads to cost savings. The disadvantage in this case is that a fish eye image cannot be used without processing and/or distortion correction. The fish eye images must therefore be normalized to produce a flat image, the view is then corrected for the desired image section (by means of bilinear imaging or using a look-up table). These steps are shown in FIG. 5. A plurality of sections can thereby be composed from the input videos for an output image. These steps and/or the methods described here can be carried out using so-called FPGAs (Field Programmable Gate Arrays) or other DSPs (digital signal processors).

One problem in this case is that with standard top view systems, vertical objects which are located further away from the vehicle are shown considerably distorted (lengthened). This invention proposes an improvement to this.

Figure 6:
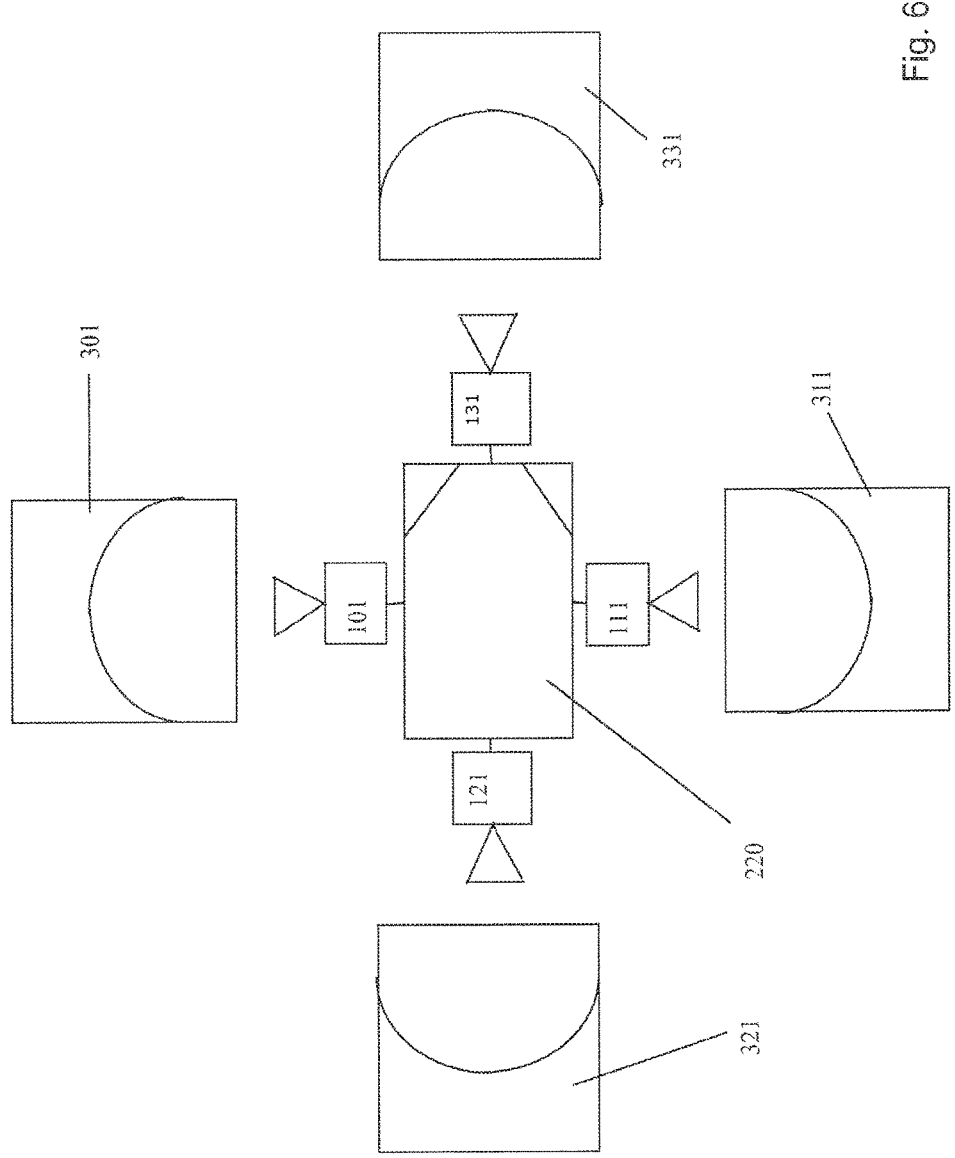
FIG. 6 shows a diagrammatic view of a vehicle having four cameras and four individual fish eye camera images (raw image data)

FIG. 6 shows a vehicle 220 with four sensors 101, 111, 121, 131 in the form of cameras, in particular fish eye cameras diagrammatically. These produce corresponding raw image data, i.e. images 301, 311, 321, 331, which are, however, optically distorted (fish eye images), so that straight lines appear curved and dimensions, in particular lengths, are distorted.

Figure 7:
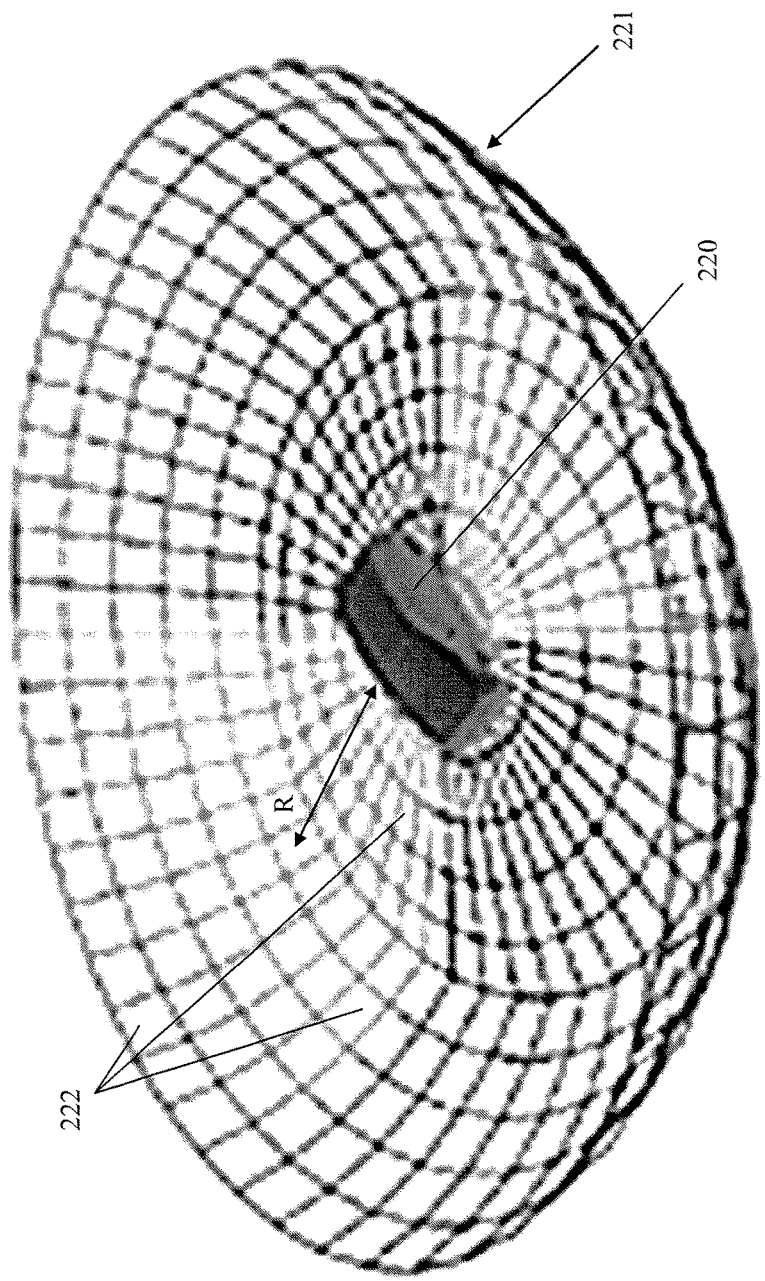
FIG. 7 shows a diagrammatic view of a 3D grid model having a radius of curvature dependent on the distance.
Figure 8:
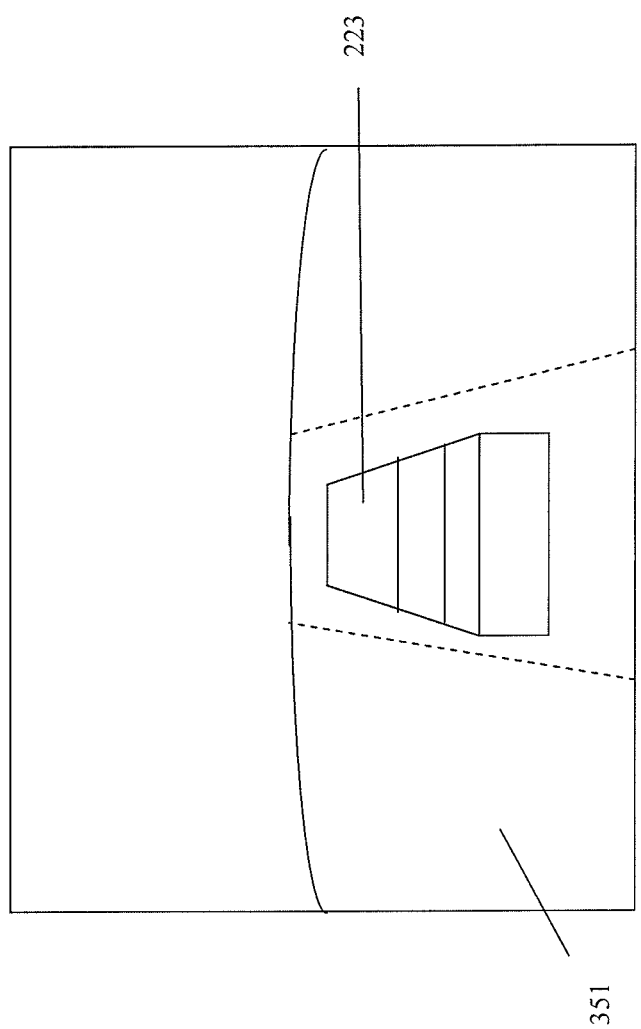
FIG. 8 shows a diagrammatic view of an image which has been distortion corrected by means of a 3D grid model.
Figure 9:
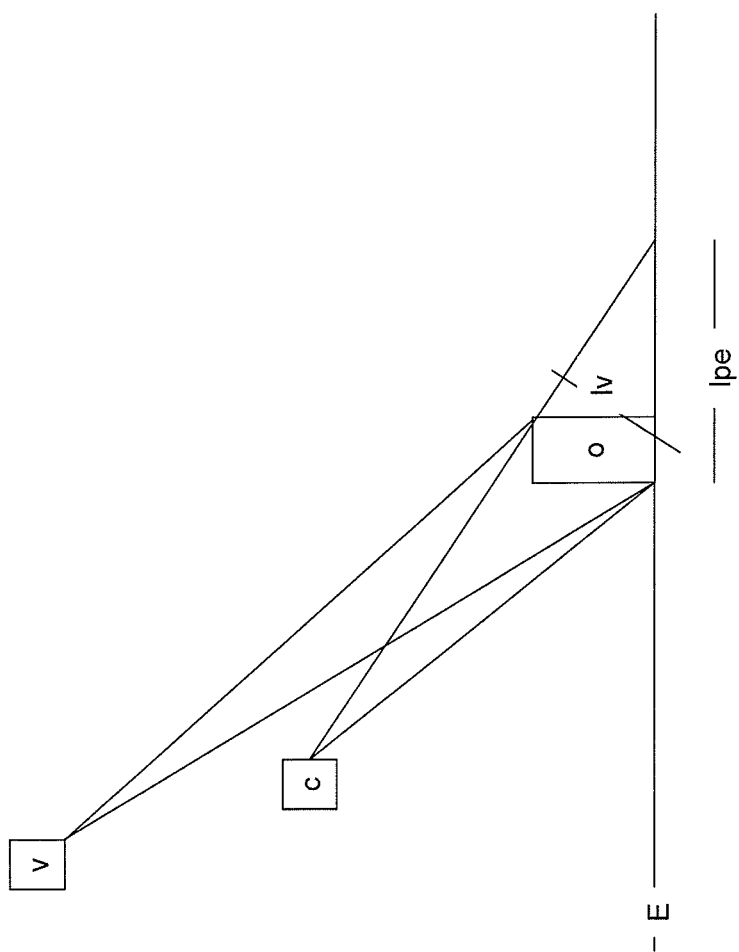
FIG. 9 shows a diagrammatic view of the length distortion when a stationary object is projected onto a plane.

FIG. 7 now diagrammatically shows a grid model which is configured as a 3D grid model 221 and wherein the cells 222 of the grid model comprise a size and form and/or orientation which is dependent on the position of the cell in the grid. The 3D grid model 221 of the surroundings of the vehicle 220 constitutes a model of a curved surface, wherein the radius of curvature (it could also be referred to as the gradient) increases as the distance R increases from the vehicle 220, comparable to a type of "key". Raw image data of each of the images 301, 311, 321, 331 can then be projected onto the 3D grid model 221 using a projection algorithm, in order to achieve an improved distortion correction of the raw image data of each of the four sensors 101, 111, 121, 131. This produces a more realistic view of the surroundings of the vehicle 220, which can also be observed from various perspectives. FIG. 8 shows such a corrected view and/or display of corrected image data of a corrected image 351 of the surroundings of the vehicle 220, which is based on the raw image data of one of the four sensors 101, 111, 121, 131 and in which the lines are straighter, dimensions such as in particular length conditions are shown more realistically, and objects such as e.g. other vehicles 223 can be better and more realistically identified. In particular, length distortions are avoided, in addition objects located further away are shown to be shorter and are therefore represented more realistically. Thanks to the use of a curved projection surface, the size of the objects shown corresponds better to their actual size than in the case of a projection onto a flat surface. This is explained more precisely with reference to FIGS. 9 and 10:

The length distortion lpe/lv during the projection of a stationary object o onto a plane E is shown in FIG. 9. C is the camera position, v represents the virtual viewpoint, from the perspective of which the vehicle surroundings are to be shown to the driver. The distortion is thereby all the greater the further away the object is from the vehicle, because the virtual viewpoint is substantially higher than the camera position.

Figure 10:
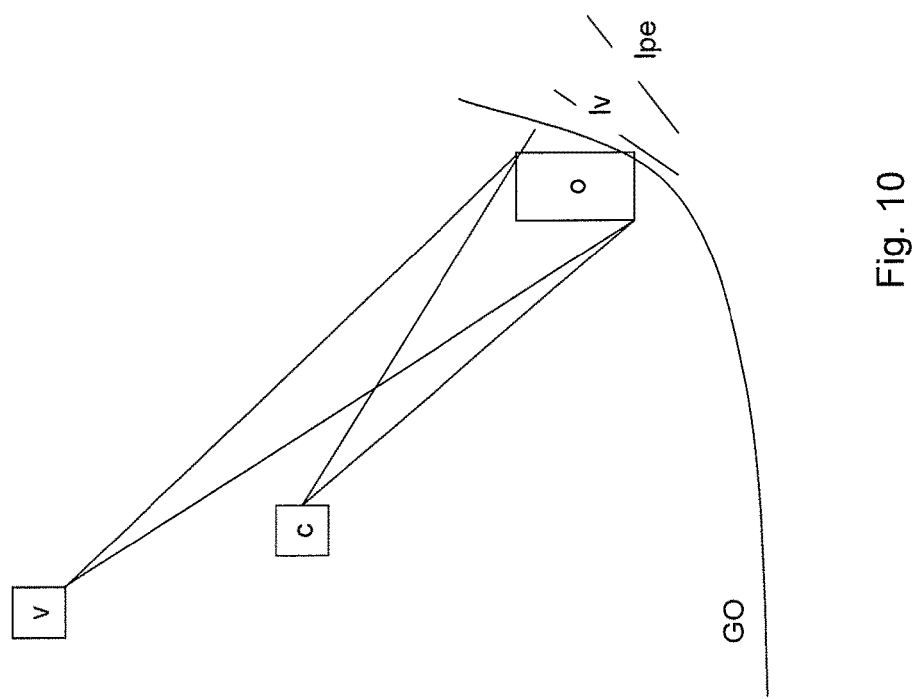
FIG. 10 shows a diagrammatic view of the length distortion when a stationary object is projected onto a curved surface.

FIG. 10 shows that this represented length of a distant stationary object O during the projection onto a curved surface GO as shown, by way of example, in FIG. 7 ("key") corresponds proportionally much better to the length of the actual object. Since the distortion of the object in the plane increases with the distance from the vehicle, the form of the curved surface is relatively flat at a short distance from the vehicle, the radius of curvature and/or the gradient of the curved surface increases further away from the vehicle.

If a 3D display element is provided, the grid information and/or cell information or the object information (position, size, extent) can in particular be helpfully used for a 3D visualization, since obstacles or other objects can be shown much more vividly to the observer in the 3D representation and thus provide the driver with a significantly improved impression of his environment. The grid model and/or the curved surface can be optimized to the extent that the surroundings look like a live 3D model. A model of the vehicle surroundings consisting e.g. of 10*10 cm frames with object height information can be used and/or produced in this case. Using this information, the projection surface can thus be modeled such that the display almost looks like a genuine 3D model of the surroundings.

REFERENCE NUMERALS

1 Sensor
2 Image conditioning device
3 Data link
4 Image processing device
5 Display apparatus
9 Data link
10 Driver assistance system
13 Vehicle dynamics
20 Vehicle
21 Grid model
22 Cell
23 Object
24 Historical object information
25 Predicted object information
26 Direction of movement
27 Object
100 Driver assistance system
101 Sensor
102 Image conditioning device
103 Data link
104 Image processing device
105 Display apparatus
106 Data link
107 Data storage device
108 Data storage device
109 Data link
111 Sensor
112 Image data conditioning area
121 Sensor
122 Image data conditioning area
131 Sensor
220 Vehicle
221 3D grid model
222 Cell
223 Vehicle
301 Image
311 Image
321 Image
331 Image
351 Corrected image
C Camera position
E Plane
GO Curved surface
o Object
R Distance
v Virtual viewpoint

The invention claimed is:
1. A method for displaying surroundings of a vehicle the method comprising:

detecting of the surroundings of the vehicle with at least one sensor and producing sensor data for the surroundings of the vehicle, conditioning the sensor data to produce raw image data, processing the raw image data to produce object information using a grid model of the surroundings of the vehicle, wherein a 3D grid model is used as a grid model, wherein cells of the grid model enclosing the vehicle are defined, and wherein identified object heights, extent, position and speed can be assigned to the cells of the grid model, to condition the raw image data to produce image object data, wherein the raw image data is projected onto the 3D grid model using a projection algorithm, and displaying the image object data.

2. The method according to claim 1, wherein
the conditioning of the sensor data to produce raw image data is performed by an image conditioning device and the processing of the raw image data to produce object information is performed by an image processing device, wherein
the image processing device receives the raw image data from the image conditioning device via a first data link, and
the conditioning of the raw image data to produce image object data based on the object information, is performed by the image conditioning device, wherein
the image conditioning device receives the object information from the image processing device via a second data link.

3. The method according to claim 1, wherein, within a framework of the processing of the raw image data, historical and/or predicted object information is additionally used.

4. The method according to claim 1, wherein the grid model of the surroundings comprises cells, wherein partial object information is assigned to these cells and object information is produced from partial object information in an object identification step.

5. The method according to claim 1, wherein the cells of the grid model comprise at least one of a size, a form and an orientation dependent on the position of the cell in the grid.

6. The method according to claim 1, wherein a 3D grid model is used as a grid model and raw image data is projected onto the 3D grid model using a projection algorithm.

7. The method according to claim 6, wherein the grid model of the surroundings of the vehicle constitutes a model of a curved surface, wherein a radius of curvature increases as a distance increases from the vehicle.

8. The method according to claim 1, wherein cell-related partial object information is assigned to the cells of the grid model and object information regarding identified objects is transmitted together with object information regarding object heights to an image conditioning device.

9. An apparatus for displaying surroundings of a vehicle, comprising:
at least one sensor for detecting the surroundings of the vehicle and for producing sensor data for the surroundings of the vehicle, an image conditioning device having image data conditioning areas which are set up to condition the sensor data to produce raw image data and to condition the raw image data using object information and/or a grid model to produce image object data, wherein the raw image data is projected onto the 3D grid model using a projection algorithm, and an image processing device which comprises a data link to the image conditioning device and which is set up to process raw image data to produce object information using a grid model of the surroundings of the vehicle, wherein a 3D grid model is used as a grid model, wherein cells of the grid model enclosing the vehicle are defined, and wherein identified object heights, extent, position and speed can be assigned to the cells of the grid model to condition the raw image data to produce image object data, wherein the raw image data is projected onto the 3D grid model using a projection algorithm, and a display apparatus for displaying the image object data.

10. The apparatus according to claim 9, wherein
the image conditioning device is connected via a first data link to the image processing device, wherein the image processing device receives the conditioned raw image data from the image conditioning device via the first data link, and
the image processing device is connected via an additional data link to the image conditioning device, wherein the image conditioning device receives the object information obtained by the image processing device from the raw image data via the additional data link.

11. The apparatus according to claim 10, wherein the image conditioning device is connected to the display apparatus for displaying image object data obtained from the raw image data and the object data.

12. The apparatus according to claim 9, further comprising additional sensors which have a data link to the image processing device, wherein the image processing device is set up to verify and/or stabilize the object information by comparison with data from the additional sensors.

13. The apparatus according to claim 9, further comprising a data storage device for storing historical and/or predicted object information, wherein the image processing device is set up to use historical and/or predicted object information within a framework of processing the raw image data.

14. The apparatus according to claim 9, further comprising a data storage device for storing a grid model of the surroundings of the vehicle, wherein the image processing device is set up to identify objects on the basis of partial object information, which is assigned to cells of the grid model and/or the image conditioning device is set up to condition raw image data on the basis of the grid model.

15. A driver assistance system having an apparatus according to claim 9.

16. The method according to claim 1, wherein the object information is verified and/or stabilized by comparison with data from additional sensors.

* * * * *